Nov. 8, 1960  R. H. SCHMUCK  2,959,240
GEOPHYSICAL PROSPECTING APPARATUS
Filed Aug. 21, 1958
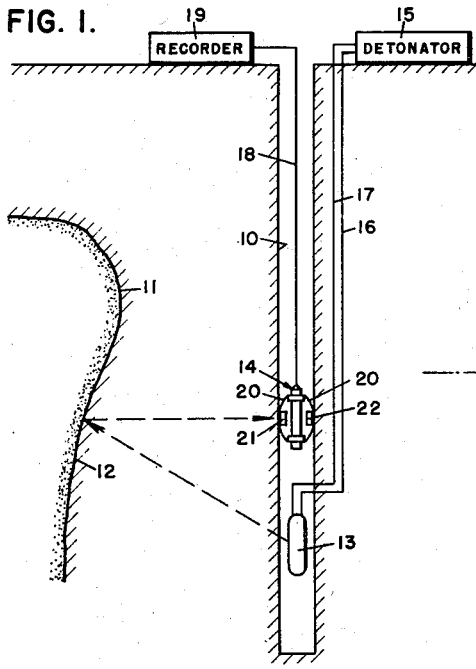
FIG. 1.
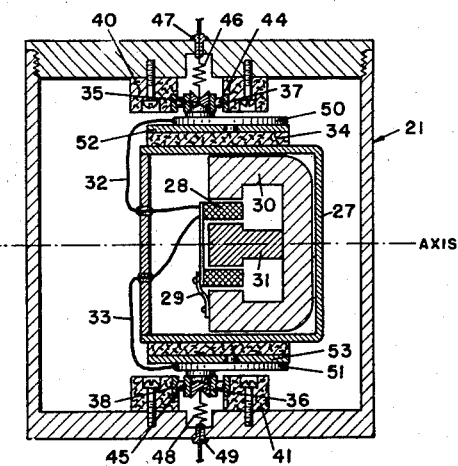
FIG. 2.
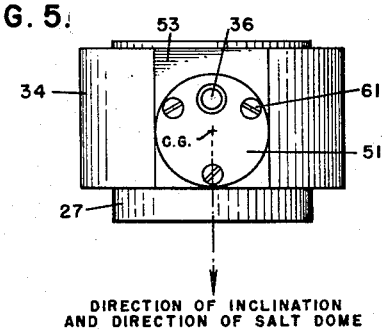
FIG. 5.
DIRECTION OF INCLINATION
AND DIRECTION OF SALT DOME
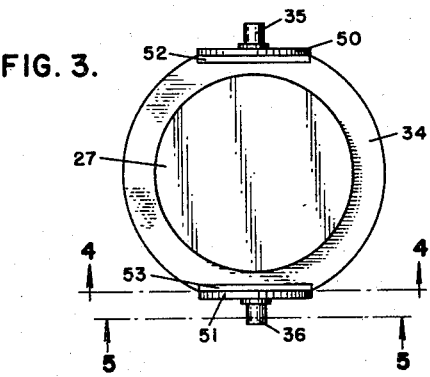
FIG. 3.
FIG. 4.
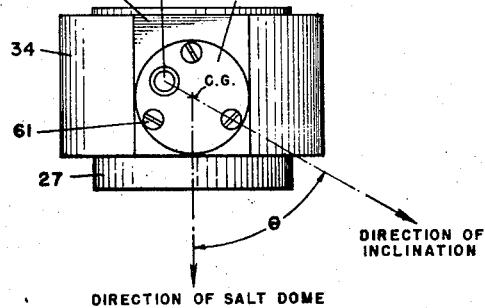
FIG. 6.
DIRECTION OF INCLINATION
DIRECTION OF SALT DOME
INVENTOR.
RUDOLPH H. SCHMUCK,
BY Frank S. Troidl
ATTORNEY.

United States Patent Office 2,959,240
Patented Nov. 8, 1960

2,959,240

GEOPHYSICAL PROSPECTING APPARATUS

Rudolph H. Schmuck, Houston, Tex., assignor, by mesne assignments, to Jersey Production Research Company, Tulsa, Okla., a corporation of Delaware Filed Aug. 21, 1958, Ser. No. 756,319

2 Claims. (Cl. 181—.5)

This invention relates to geophysical prospecting. More particularly, this invention relates to apparatus for determining the profile of subsurface structures.

The invention is particularly adapted to determine the position of very steep or substantially vertical boundary surfaces such as are found on flanks of salt domes, igneous intrusions, and dikes.

The profiling of the vertical or flank portion of salt domes is of great practical and economic importance. In general, any oil deposits adjacent a salt dome are located adjacent the flank or vertical surface of the salt dome. Because of hydrostatic pressure and water-oil displacement principles, the best location for a well to produce oil from deposits adjacent the flank of a salt dome is near the highest point of the deposits. It is therefore a matter of considerable importance that the location of the vertical portion or flank of the salt dome be determined precisely with reference to some known point on the surface of the ground.

Geophysical methods of profiling subsurface structures such as salt domes have been used before. This profiling in general has been done by either the refraction method or the reflection method. The refraction method is employed in the patent to McCollum, 1,923,107, issued August 22, 1933. The reflection method is disclosed in the patent to McCollum, 2,021,943, issued November 26, 1935.

More recently it has been found that better and more accurate determinations of the profile of subsurface structures can be obtained using detectors which are directionally sensitive. The directionally sensitive detectors are insensitive to components of the seismic waves, except the component in a particular direction. For example, detectors may be used which are sensitive only to the component of the seismic wave impinging the detector in a line parallel to the longitudinal axis of the detector.

In the past, attempts to orientate the directionally sensitive detector in the proper direction have required complicated servo arrangements for orientating the detector in any desired direction and have also required complicated means for recording at any given moment the direction in which the detector is orientated as it is lowered within a borehole. Such a system is shown in the patent to O. Weiss, 2,718,929, issued September 27, 1955.

My invention provides the art with an improved method for accurately determining the profile of subsurface structures and includes a detector system with at least one directionally sensitive detector whose axis may be orientated as desired. In its broader aspects the method consists of first producing seismic waves. The seismic waves are detected by at least one directionally sensitive detector assembly. The directionally sensitive detector assembly is adapted to automatically orientate the sensitive axis of the detector, or detectors, in the assembly to receive the desired component of the seismic waves.

A new and novel detector arrangement is also disclosed herein. In its broader aspect, the apparatus disclosed herein includes a directionally sensitive detector, with the directionally sensitive detector mounted for rotational movement about an axis. Means are provided for automatically orientating the directionally sensitive detector toward the subsurface structure at any depth within the borehole. A preferred embodiment of the inventive concept is described.

The invention will be described with respect to its use in making profiles of subsurface structures utilizing the seismic reflection principle. However, it is to be understood that the apparatus may be used for carrying out refraction profiling. The apparatus can be used any time a seismic wave is initiated at a particular origin and it is desired to automatically position the sensitive axis of a directionally sensitive detector in the direction of the seismic wave component to be detected.

The invention, as well as its many advantages, will be further understood by reference to the following description and drawings, in which:

Fig. 1 is a schematic view showing one manner in which my new apparatus may be used in profiling a subsurface structure;

Fig. 2 is a sectional view through one type of detector arrangement built according to the invention, a portion thereof being shown schematically;

Fig. 3 is a front view of a part of the detector;

Fig. 4 is a view taken along line 4—4 of Fig. 3;

Fig. 5 is a view taken along line 5—5 of Fig. 3; and

Fig. 6 is a view similar to Fig. 5 showing the sensitive axis of the directionally sensitive detector facing a different direction with respect to the direction of inclination of the borehole from that shown in Fig. 5.

Referring particularly to Fig. 1, a borehole 10 is shown. Bore hole 10 is horizontally spaced from the subsurface structure, the profile of which it is desired to determine. The structure shown in Fig. 1 is a salt dome 11. The inclination and the direction of inclination of borehole 10 have been previously determined. The inclination and direction of inclination can be ascertained by means of any one of many inclinometers well known in the art. Also, the seismic velocity through the material or subsurface formations separating the vertical portion or flank 12 of salt dome 11 from borehole 10 has been previously determined.

Shown lowered into the borehole 10 are a seismic wave source 13 and a detector assembly 14 for detecting the horizontally reflected seismic waves. The seismic wave source 13 and detector assembly 14 may be mounted in separate tools as shown, or in the alternative, may be enclosed in the same logging tool. The wave source 13 may be any suitable source for setting up seismic waves of sufficient intensity to impinge upon the flank 12 of the salt dome and be reflected back to be detected by the detectors in the detector assembly 14. However, I prefer to use a perforating gun. The perforating gun may be operated at any desired depth within the borehole 10 by means of the detonator 15 located at the earth's surface and connected to the perforator 13 by means of electrical wires 16 and 17. Actually, the wires 16 and 17 do not extend through the earth as shown in Fig. 1. They are shown this way for purposes of clarity. Wires 16 and 17 are actually included within the logging tool with the source 13 and detector assembly 14 and extend upwardly within the borehole 10 to the detonator 15.

The reflected seismic waves, which are travelling in an essentially horizontal direction, are detected by the detectors 21 and 22 in detector assembly 14 and are transmitted through cable 18 to a recorder 19. Knowing the origin time of the seismic waves from source 13, the time at which these reflected waves are detected, and the velocity of the material separating the flank 12 of salt dome 11 from the borehole 10, the exact location of points on flank 12 of salt dome 11 can be ascertained.

Means (not shown) are provided for moving the source 13 and detecting means 14 upwardly and downwardly within the borehole 10. By firing the gun 13 at various desired depths within the borehole 10, a plurality of points on the flank 12 of salt dome 11 may be determined so that the complete profile of the salt dome can be ascertained.

Though one detector assembly 14 is shown in Fig. 1, it is to be understood that, if desired, a plurality of vertically spaced detector assemblies may be used. Also, though two detectors 21 and 22 are shown mounted within detector assembly 14, one detector, or more than two can be used.

As formerly stated, it is desired to detect the horizontally reflected seismic waves. Direct waves from the source 13 cause unwanted signals. Unwanted signals also result from cable kicks caused by vibrations and twisting of the cable 18, and especially any cable between source 13 and assembly 14. Still another problem is that of mounting the geophones rigidly within the borehole to prevent movement relative to any fluids which may be contained in the borehole, since such movement would result in spurious signals. The effect of the direct waves may be eliminated by using geophones which are directionally sensitive and oriented so that only the horizontally reflected seismic waves are detected. The unwanted spurious signals caused by the movement of the cables and movement of the geophone relative to fluids in the borehole can be eliminated by using a geophone locking arrangement which includes the bow springs 20, to which the geophones 21 and 22 may be attached. The bow springs 20 hold the geophones in rigid contact with the sides of the borehole. In this manner, the geophones detect only the movement of the seismic waves in the formations and are unresponsive to cable kick and relative movement. A detailed description of the geophone lock-end means may be had by reference to the patent to Jolly, 2,786,987, issued March 26, 1957.

The detector 21 is shown in more detail in Fig. 2. The structure of detector 22 is similar to detector 21. Referring to Figs. 2 and 3, the detector includes a housing 27 containing a coil 28 resiliently suspended by spring 29 in air gaps of an armature 30 that includes a permanent magnet element 31. The coil 28 is mounted for movement along the axis of the detector 21. A voltage is generated in the coil which is proportional to the relative velocity of the coil and the detector housing. Thus, when the seismic waves are detected, the coil will move with a velocity proportional to the velocity of movement of the seismic waves. Voltages generated from the coil 28 are fed through conductors 32 and 33 and through cable 18 (see Fig. 1) to the recorder 19.

Notice that the axis of the coil 28 and magnet 31 is in general perpendicular to the axis of the borehole. The coil 28 is moved in response only to the components of the seismic waves parallel to the axis indicated. The coil 28 is substantially unresponsive to the components of seismic waves from any other direction.

The detector includes a casing 34 of insulating material which is mounted for rotational movement about an axis through upper pivot 35 and lower pivot 36. Pivots 35 and 36 fit into ball bearings 37 and 38, respectively. The ball bearings 37 and 38 each include an outer cylindrical member which is stationarily mounted to insulating mounts 40 and 41, respectively. The outer cylindrical members and inner cylindrical members of the ball bearings are separated by a plurality of metal balls 44 and 45. The pivots 35 and 36 fit snugly against the inner cylindrical members.

A coil wire 46 is in contact with pivot 35 and with electrical conducting cable 18. Similarly, a coil wire 48 is in contact with pivot 36 and with electrical conductor 18. Wires 46 and 48 extend through glass beads 47 and 49, respectively. Hence, voltages through wires 32 and 33 are conducted through pivots 35 and 36, respectively, springs 46 and 48, respectively, and cable 18.

Pivots 35 and 36 are integrally connected to pivot blocks 50 and 51, respectively, which in turn are connected to pivot block mounts 52 and 53, respectively. The manner in which the pivot blocks 50 and 51 are connected to pivot block mounts 52 and 53 will be subsequently described.

The outer case of the detector is preferably filled with a damping fluid for proper damping and pressure equalization.

The structure of the detector arrangement is such that its center of gravity is eccentric to a line through pivots 35 and 36. Hence, as the detector 21 is lowered to particular depths within the borehole, the force of gravity will rotate the casing 34 in a direction such that the center of gravity falls toward the low side of the borehole. Because the borehole has been previously surveyed and the inclination and direction of inclination at various depths in the borehole are known, the angular separation of, first, a plane which includes the rotational axis and the center of gravity, and second, the sensitive direction of the detector, may be adjusted so that at the depths at which it is desired to take measurements, the sensitive direction of the detector will automatically be orientated in a direction to receive the horizontally reflected seismic waves. The manner in which this angular separation of the line joining the rotational axis and the center of gravity and the sensitive direction of the detector is adjusted, may be further understood by reference to Figs. 4, 5, and 6.

Referring to Fig. 4, the pivot block mount 53 includes a plurality of tapped holes 60 circularly formed about the center, with the tapped holes being spaced about 30 degrees apart. The pivot block mount 52 is similar in structure to pivot block mount 53. If desired, the tapped holes may be made in the casing 34, making pivot block mounts 52 and 53 unnecessary.

Referring to Fig. 5, the pivot block 51 includes a plurality of holes angularly separated by about 120 degrees, in which are disposed threaded screws 61. The structure of the upper pivot block 50 is similar to that of lower pivot block 51. Notice that the center of gravity is offset from the axis of the pivot 36. Hence, as the detector arrangement is lowered down the borehole, the force of gravity will cause the detector arrangement to rotate about the ball bearings until the center of gravity lies toward the low side of the borehole.

The direction of maximum sensitivity of the detector is shown in Fig. 5 as being in the same direction as the direction of inclination. This arrangement is used if the borehole is inclined directly toward the dome or away from the dome. When lowered to the proper position, the sensitive direction is automatically orientated toward the salt dome 11 so that the reflected seismic waves are detected to the exclusion of other waves.

If measurements are to be taken at points within the borehole where the direction of inclination is not directly toward the flank 12 of the salt dome 11, the angular separation of the plane joining the pivot to the center of gravity and the sensitive direction can be adjusted so that when the proper position is reached within the borehole, the sensitive direction will automatically aim toward the flank 12. This is accomplished by unscrewing the screws 61 and rotating the pivot blocks 50 and 51 until the proper angular separation is obtained. The screws are then placed in the proper holes 60 in pivot block mounts 52 and 53. Referring to Fig. 6, such an adjustment is shown. The angular separation of the direction of inclination from the direction of the salt dome at a particular point within the borehole horizontally spaced from the salt dome is indicated by the angle $\theta$. Hence, when the detector is lowered to the desired position where the borehole has the direction of inclination indicated in Fig. 6, the detector arrangement will automatically swing to a position such that the line joining the pivot axis and the center of gravity will aim in the direction of inclination. The sensitive axis of the directionally sensitive detector arrangement is then automatically pointed directly toward the flank 12 of salt dome 11.

If desired, eccentric weight means other than the particular structure shown may be provided. The essence of the invention and method is a detector arrangement with the provision of an eccentric weight offset in such a direction from the axis of rotation of the detector so that when the detector arrangement is tilted in a known direction, the arrangement will automatically align the direction of maximum sensitivity of the detector in a certain desired direction.

In operation, the source of seismic waves and the seismic detector assembly are lowered down the borehole, or in the alternative, raised upwardly from the bottom of the borehole. The source 13 is successively operated at different depths within the borehole to initiate seismic waves. The detector arrangements in the detector assembly have been adjusted so that they will automatically orientate the axis of maximum sensitivity toward the salt dome flank. If desired, a plurality of vertically spaced detector assemblies 14 may be provided along the cable 18, with the proper adjustment supplied. The time it takes the seismic waves to go from the source 13, be reflected from flank 12, and detected by the detectors following a path indicated by the arrows in Fig. 1, is indicated by the recorder 19. Knowing this time period and the seismic velocity characteristics of the material separating the salt dome from the borehole, the distance of the various points on the flank 12 from the borehole 10 can be ascertained.

I claim:

1. For use in profiling a subsurface structure from a surveyed borehole horizontally spaced from the subsurface structure by material having a known seismic velocity: a detector arrangement including a directionally sensitive detector and an eccentric weight means mounted for rotational movement about a common axis, the angular separation between a plane which includes the rotational axis and the center of gravity of the eccentric weight means and the sensitive direction of the detector being such that the sensitive direction of the detector will point to the subsurface structure at a desired depth in the borehole and means operatively connected with said directionally sensitive detector and eccentric weight means for adjusting said angular separation.

2. For use in profiling a subsurface structure from a surveyed borehole horizontally spaced from the subsurface structure by material having a known seismic velocity: a housing mounted for rotational movement about an axis; a directionally sensitive detector within said housing, the center of gravity of the housing and directionally sensitive detector being offset from said axis with the angular separation between, first, a plane which includes the rotational axis and the center of gravity, and, second, the sensitive direction of the detector being such that the sensitive direction of the detector will point to the subsurface strucutre at a desired depth in the borehole; and means operatively connected with said directionally sensitive detector for adjusting said angular separation.

References Cited in the file of this patent

UNITED STATES PATENTS

| | | |
|---|---|---|
| 2,021,943 | McCollum | Nov. 26, 1935 |
| 2,438,293 | Livingston | Mar. 23, 1948 |
| 2,451,443 | Merten | Oct. 12, 1948 |
| 2,492,794 | Goble et al. | Dec. 27, 1949 |
| 2,590,531 | McLoad | Mar. 25, 1952 |
| 2,718,929 | Weiss | Sept. 27, 1955 |
| 2,786,987 | Jolly | Mar. 26, 1957 |